(12) United States Patent
Seto et al.

(10) Patent No.: US 6,337,865 B1
(45) Date of Patent: Jan. 8, 2002

(54) FAIR BUFFER CREDIT DISTRIBUTION FLOW CONTROL

(75) Inventors: Pak-Lung Seto, Shrewsbury; Satish Rege, Groton, both of MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/158,761

(22) Filed: Sep. 23, 1998

(51) Int. Cl.[7] .................................................. H04J 3/00
(52) U.S. Cl. ....................................................... 370/450
(58) Field of Search ................................. 370/400, 450, 370/389, 395, 252, 254, 449, 451, 453, 456, 454, 459, 460, 461, 462, 503, 447, 463, 403, 404–409

(56) References Cited

U.S. PATENT DOCUMENTS 5,793,981 A * 8/1998 Billings ....................... 370/365
5,923,663 A * 7/1999 Bontemps et al. .......... 370/445

* cited by examiner

Primary Examiner—Dang Ton
(74) Attorney, Agent, or Firm—David M. Sigmond

(57) ABSTRACT

A data transfer management method is provided for transferring data between nodes of a multi-node communication system. The method provides target nodes with fair opportunity to transfer data to originator nodes in the communication system. The originator node initiates data transfer by establishing a connection with one or more target nodes. The originator node signals target nodes to transfer data by generating and transmitting credit tokens over the network. Before a target node can transfer data to the originator node, it must receive and absorb at least one credit token from the originator. All credit tokens transmitted by the originator node and not absorbed by target nodes return back to the originator node. Each target node is provided with buffer credit tokens up to its quota in a rotating manner.

36 Claims, 13 Drawing Sheets

*10*

FAIR BUFFER CREDIT DISTRIBUTION FLOW CONTROL

FIELD OF THE INVENTION

The present invention relates to managing communication within a multi-node network, and, more particularly, to a method and apparatus for managing data transfer in such a network to assure that contending nodes with access to the network can transfer data to other nodes over the network.

BACKGROUND

Existing communication systems include a plurality of data processing nodes interconnected via a communication network. Typically arbitration is required for a node to gain access to the network for data transfer with other nodes. After winning the arbitration, an originator node establishes a virtual point-to-point connection with a target node. The originator node then transmits buffer credit tokens to the target node over the network, signaling the target node to transfer data packets to available buffers in the originator node over the network. Credit tokens sent from that originator node are only absorbed by the intended target node.

In arbitration-less networks, such as arbitration-less ring or tree type interconnect topology networks, an originator node does not establish a virtual point-to-point blocking connection with a target node. Therefore, data transfer management is necessary to assure that each target node with access to the network receives credit tokens from an originator node to transfer data to that originator node. Otherwise, as described below, one or more contending target nodes within the network can "starve". FIG. 1 illustrates a block diagram of an example prior art multi-node communication system 10 comprising nodes 15, 20, 25, 30, 35, 40, 45 and 50 interconnected via a ring network 55. The nodes 15, 20, 25, 30, 35 and 40 can comprise target storage devices such as disk drives, and the nodes 45 and 50 can comprise originator host systems including host adaptors.

In an example data transfer scenario, the originator node 45 establishes a connection with the target nodes 15, 25 and 35. Once it has available buffer space to receive data, the originator node 45 transmits credit tokens over the network 55 signaling the connected target nodes 15, 25 and 35 to transfer data packets to the node 45. The nodes 15, 25 and 35 can only send data packets to the node 45 if they receive credit tokens from the node 45. The node 45 is unaware of which one of the nodes 15, 25 or 35 absorbs the transmitted credit tokens from the network 55. However, since the nodes 35 and 25 are closer in sequence to the node 45 in the network 55, they can absorb all of the transmitted credit tokens and transfer data to the node 45 depending on the number of data packets they need to transfer to the node 45. Therefore, the node 45 cannot guarantee that the target node 15 will receive any credit tokens. As such, the nodes 35 and 25 can continue absorbing credit tokens from the node 45 and starve the node 15 downstream.

Conventional communication management methods attempt to solve this problem by utilizing anti-starvation methods. One such method is based on an addressable buffer credit scheme in which an originating node places a target node address in each credit token such that only that intended target node can use the credit token. The originating node reserves available data buffers therein for such target nodes. Though in this scheme each target node is guaranteed a credit token over time, and, therefore, the right to transfer data to the originating node, some target nodes with credit tokens may not have any data to transfer immediately. As such, target nodes without any credit tokens and waiting to transfer cumulated data, must idle while available data buffers in the originating node remain reserved and unused. As a result, communication systems implementing the addressable buffer credit scheme suffer from slow response time and are wasteful of resources. Further, such communication systems are unsuitable for real-time applications where target nodes with real-time need to transfer data require fair opportunity to transfer data promptly.

One solution to the above problem can include providing each originating node with additional buffer space. However, such additional buffer space is costly to obtain and consumes precious physical space within the nodes. Yet, another disadvantage of the addressable buffer credit scheme is that since an originating node reserves buffer space for target nodes down stream from the originating node, the reserved buffer space in the originating node remains unused while credit tokens intended for the target nodes make their way through the network traffic to signal the target nodes to transfer data to the originating node. And, buffer credit distribution involves high processing and space overhead for proper data transfer management.

There is, therefore, a need for a method and apparatus for managing data transfer in multi-node communication systems to assure that contending nodes in the communication system have fair opportunity to transfer data to other nodes over the network. There is also a need for such a method and apparatus to be simple, efficient and provide the nodes with timely opportunity to transfer data over the network.

SUMMARY

The present invention satisfies these needs. In one embodiment, the present invention provides a method for transferring data between nodes of a multi-node communication system, including at least one originator node and a plurality of target nodes interconnected via a network. The method provides target nodes with fair opportunity to transfer data to originator nodes over the network. The originator node initiates data transfer by establishing a connection with one or more target nodes. The originator and the target nodes then cooperate as described below to provide the target nodes with fair opportunity to transfer data to the originator node.

After establishing connections with the target nodes, the originator node signals target nodes to transfer data by generating and transmitting credit tokens over the network. Before a target node can transfer data to the originator node, it must receive and absorb at least one credit token from the originator. All credit tokens transmitted by the originator node and not absorbed by the target nodes return back to the originator node over the network. Each originator node has two states of operation. In the first state of operation, the originator node generates a first type of credit token. And, in the second state of operation, the originator node generates a second type of credit token. The originator node changes from one state to another upon an originator toggle condition being satisfied. Similarly, each target node has two states of operation. In the first state of operation the target node can only absorb the first type of credit token from a desired originator node. And, in the second state of operation, the target node can only absorb the second type of credit token from a desired originator node. Each target nodes changes from one state to another upon satisfaction of a target toggle condition. As such, each target node is provided with buffer credit tokens up to its quota in a rotating manner.

Each target node can have a different quota for the number of credit tokens the target node may absorb from an originator node. The target toggle condition for each target node can comprise the node's credit token count reaching the node's quota of credit tokens that it can absorb from that originator node. Alternatively, the target toggle condition for each target node can comprise a credit token being absorbed by the target node from that originator node. If a target node does not absorb a received credit token, it can re-transmit the credit token over the network. For each target node, if the credit token count is greater than zero, the target node can transmit an available data packet to the originator node and decrement the count by one. The originator toggle condition can comprise receiving a previously transmitted credit token back from the network. Alternatively, the originator toggle condition can comprise the originator node transmitting the Nth credit token.

In another aspect the present invention also provides a communication system implementing the method of the present invention.

BRIEF DESCRIPTION OF THE DRAWINGS

These and other features, aspects and advantages of the present invention will become better understood with regard to the following description, appended claims and accompanying drawings where:

DESCRIPTION

Figure 1:
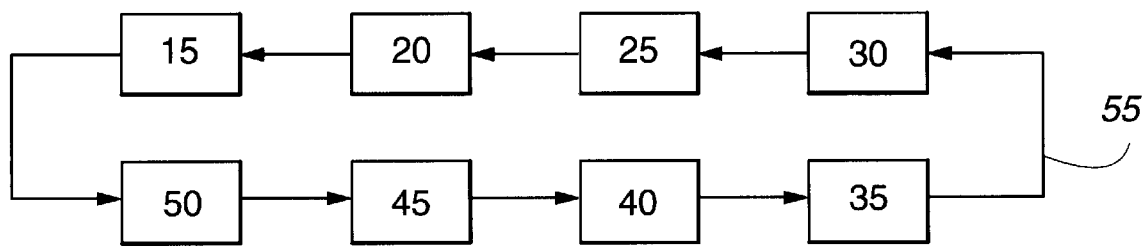
FIG. 1 shows a block diagram of a prior art multi-node communication network.
Figure 2:
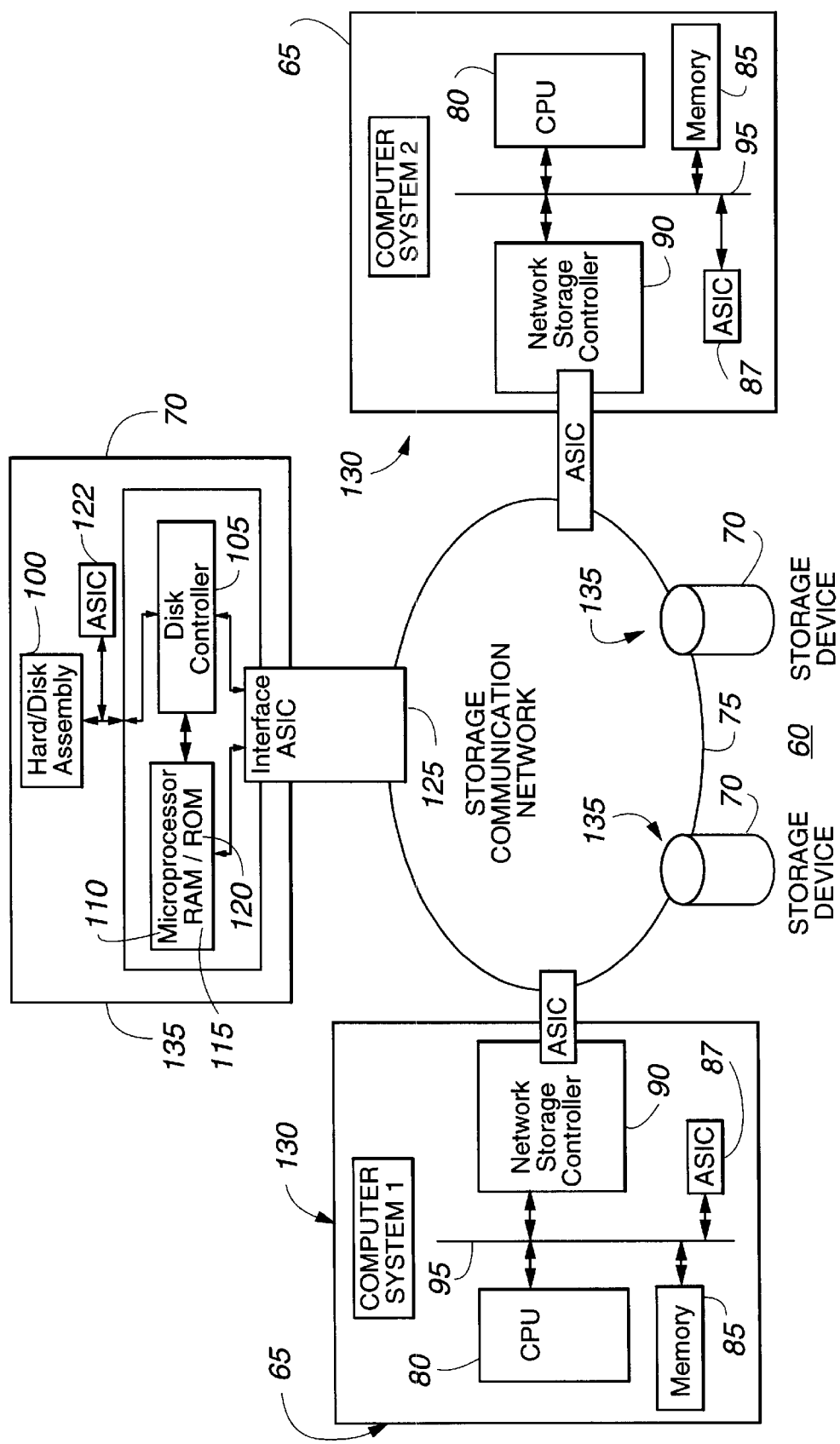
FIG. 2 shows an example communication system architecture in which the present invention can be implemented.

FIG. 2 shows a block diagram of an example communication system 60 in which a method embodying aspects of the present invention can be implemented. The communication system 60 typically includes one or more data processing nodes such as host systems 65 and storage devices 70 interconnected via a communication network 75. Each node includes means for controlling data transmission and/or reception from other nodes over the network 75. The network 75 can comprise a tree or loop/ring interconnect topology, as well as other interconnect topologies. In the example communication system 60 shown in FIG. 2, the network 75 comprises a loop/ring interconnect topology. Each host system 65 includes a CPU 80, memory 85, logic circuit 87 and network controller 90 interconnected via a bus 95 as shown. Each storage device 70 comprises a disk drive including a head/disk assembly 100, a disk controller 105, a microprocessor 110, random access memory (RAM) 115, read only memory (ROM) 120, logic circuit 122 and a network interface 125 interconnected as shown. As those skilled in the art will recognize, the present invention is capable of being implemented in a communication system having other storage devices and interconnect topologies, and for managing transfer of data between such storage devices.

In the example communication system 60, each host system 65 can be an originator node 130 and each storage device 70 can be a target node 135. The originator node 130 initiates data transfer by establishing a connection with one or more target nodes 135 over the network 75. The originator node 130 and the target nodes 135 cooperate to provide the target nodes 135 with fair opportunity to transfer data to the originator node 130 according to the method of present invention. The originator node 130 signals target nodes 135 to transfer data by generating and transmitting credit tokens over the network 75. Before a target node 135 can transfer data to the originator node 130, it must receive and absorb at least one credit token from the originator node 130. All credit tokens transmitted by the originator node 130 and not absorbed by target nodes 135 return back to the originator node 130 over the network 75.

Figure 3:
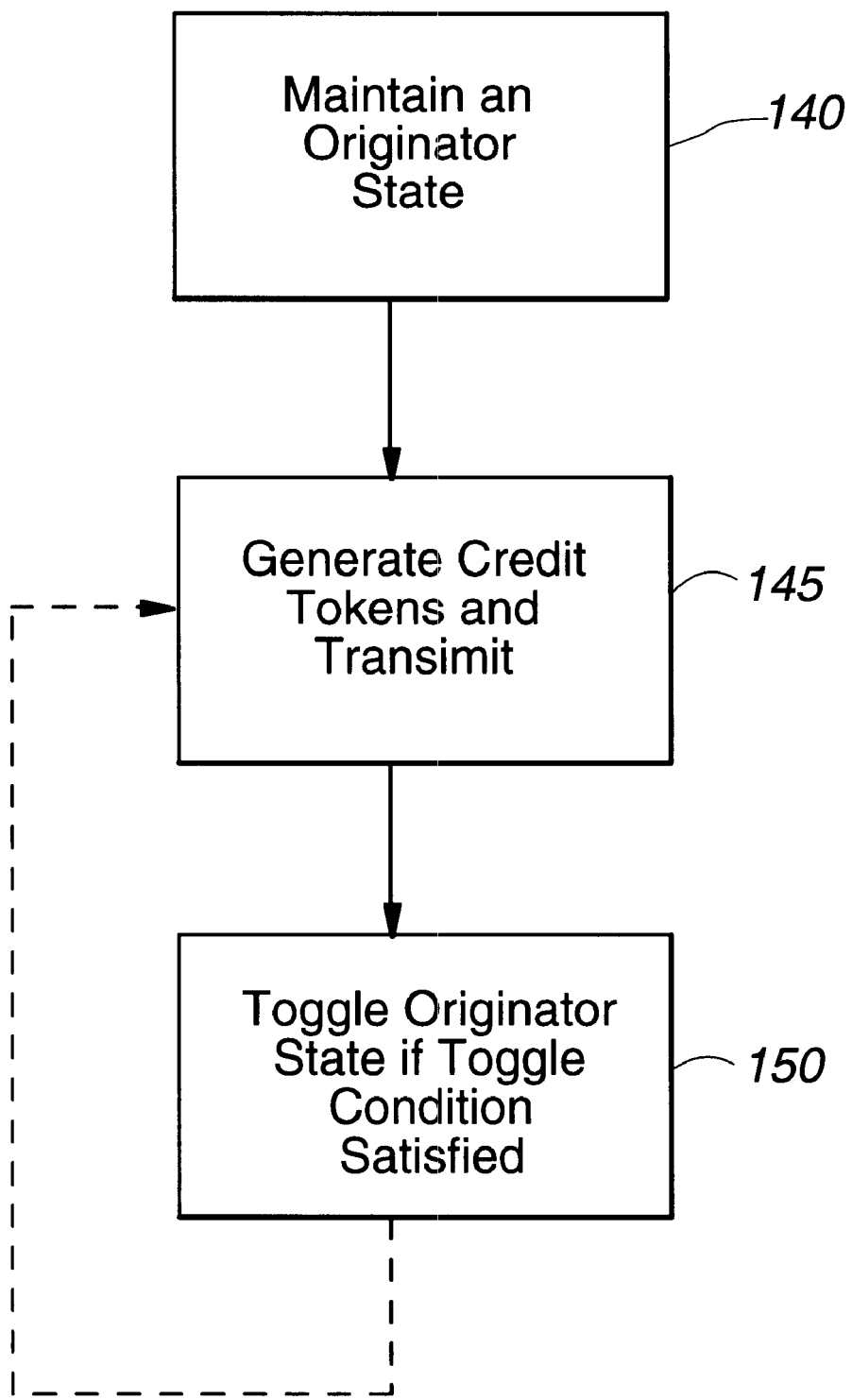
FIG. 3 shows an embodiment of the steps of a method of credit token distribution for an originator node according to the present invention.

Referring to FIG. 3, according to an embodiment of the present invention, the originator node 130 performs steps including: maintaining at least one originator state including a first state and a second state (step 140); if the originator node 130 desires to receive at least one data packet, generating a credit token and transmitting the credit token over the network 75 to signal one or more target nodes 135 to transfer data to the originator node 130 (step 145); and toggling the originator state from one state to another upon a generator toggle condition being satisfied (step 150). Generating a credit token comprises generating a token of: (1) a first type if the originator state is in the first state, or (2) a second type if the originator state is in the second state.

Figure 4:
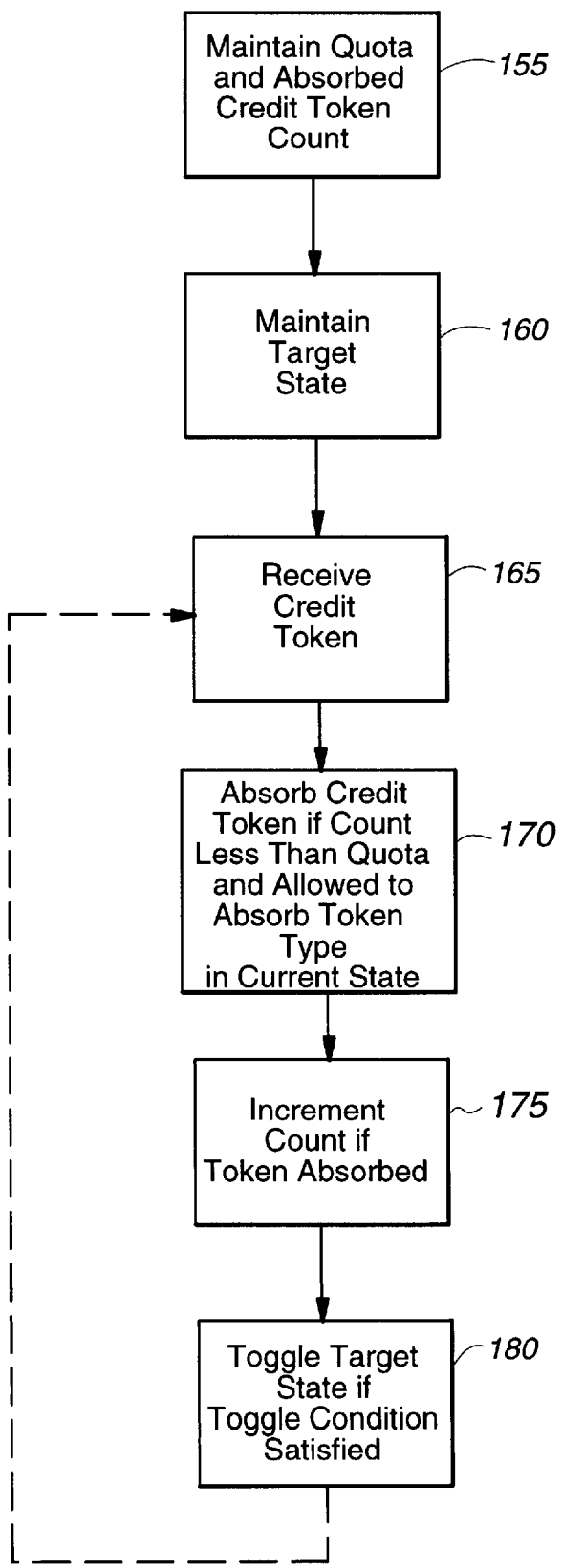
FIG. 4 shows an embodiment of the steps of a method of credit token distribution for a target node according to the present invention.

Referring to FIG. 4, each target node 135 performs steps including: maintaining (1) a count of credit tokens absorbed by the target node from the network 75 and (2) a quota of the number of credit tokens the target node 135 may absorb from the originator node 130 (step 155); maintaining a target state including: (1) a first state indicating that the target node 135 can only absorb credit tokens of the first type and (2) a second state indicating that the target node 135 can only absorb credit tokens of the second type (step 160); receiving a credit token from the network 75 (step 165); absorbing the received credit token from the network 75 if: (1) the credit token is of a type corresponding to the state of the target state, and (2) said count is less than the quota for the target node (step 170); incrementing said count by one if a token is absorbed by the target node 135 (step 175); and toggling the target state from one state to another if a target toggle condition is satisfied (step 180).

As such, each originator node 130 has two states of operation corresponding to its originator state. In the first state of operation, the originator node 130 generates the first type of credit token. And, in the second state of operation, the originator node 130 generates the second type of credit token. The originator node 130 transitions from one state to another when its toggle condition is satisfied. Similarly, each target node 135 has two states of operation corresponding to its target state. In the first state of operation the target node 135 can only absorb the first type of credit token from a desired originator node 130. And, in the second state of operation, the target node 135 can only absorb the second type of credit token from a desired originator node 130. Each target node 135 transitions from one state to another when its toggle condition is satisfied. Accordingly, each target node 135 is provided with one or more buffer credit tokens from an originator node 130 in a rotating manner, providing the target node 135 a fair opportunity to transfer data to the originator node 130 over the network 75.

Each target node 135 can have a different quota for the number of credit tokens the target node 135 may absorb from an originator node 130. The target toggle condition for each target node 135 can be satisfied when the credit token count of the target node 135 reaches the quota of credit tokens from the originator node 130 for that target node. Alternatively, the target toggle condition for each target node 135 can be satisfied when the target node 135 absorbs a credit token. If a target node 135 does not absorb a received credit token, it can re-transmit the credit token over the network 75. If the credit token count of a target node 135 is greater than zero, the target node 135 can transmit an available data packet to the originator node 130 and decrement its token count by one. The originator toggle condition can be satisfied every time the originator node 130 receives back from the network 75 a credit token which the originator node 130 previously generated and transmitted over the network 75. Alternatively, the originator toggle condition can be satisfied every time the originator node 130 generates and transmits a certain number of credit tokens.

In one embodiment of the invention, each target node 135 can select the type of credit token it can initially absorb from an originator node 130. The type of credit token each target node 135 can absorb can also be pre-selected based on implementation requirements. Further, each target node 135 can select the total number of credit tokens it can absorb from each different originator node 130, up to, or less than, its specified quota for that originator node 130. In this embodiment, after a target node 135 absorbs credit tokens up to its quota, it can no longer absorb the same type of credit token. The next credit token the target node 135 can absorb must be of the other type. However, before reaching its quota, if a target node 135 chooses not to absorb any more credit tokens of one type, e.g. end of data transfer, the target node 135 can toggle its state to absorb the other type of credit token. Further, if a target node 135 absorbs credit tokens of one type up to its quota and then receives a credit token of another type, the target node 135 can toggle its state to absorb either type of credit token. Thereafter, when the target node's credit token count drops below its quota, the target node again follows its selective credit token absorption routine.

If any target node 135 has no data to transfer, it is not required to absorb any credit tokens, and simply passes any credit tokens down stream. This is the case where one or more target nodes 135 do not have any data to transfer to an originator node 130, or have no data to transmit at all. This allows other target nodes 135 with accumulated data to transfer data promptly. Alternatively, the target nodes 135 can be programmed to absorb credits up to their quota, though they have no data to transfer. For example, a disk drive anticipating that it may have data to transfer in the near future, can absorb credit tokens from a host system thought the disk drive does not have any data to transmit that host system immediately.

Figure 5:
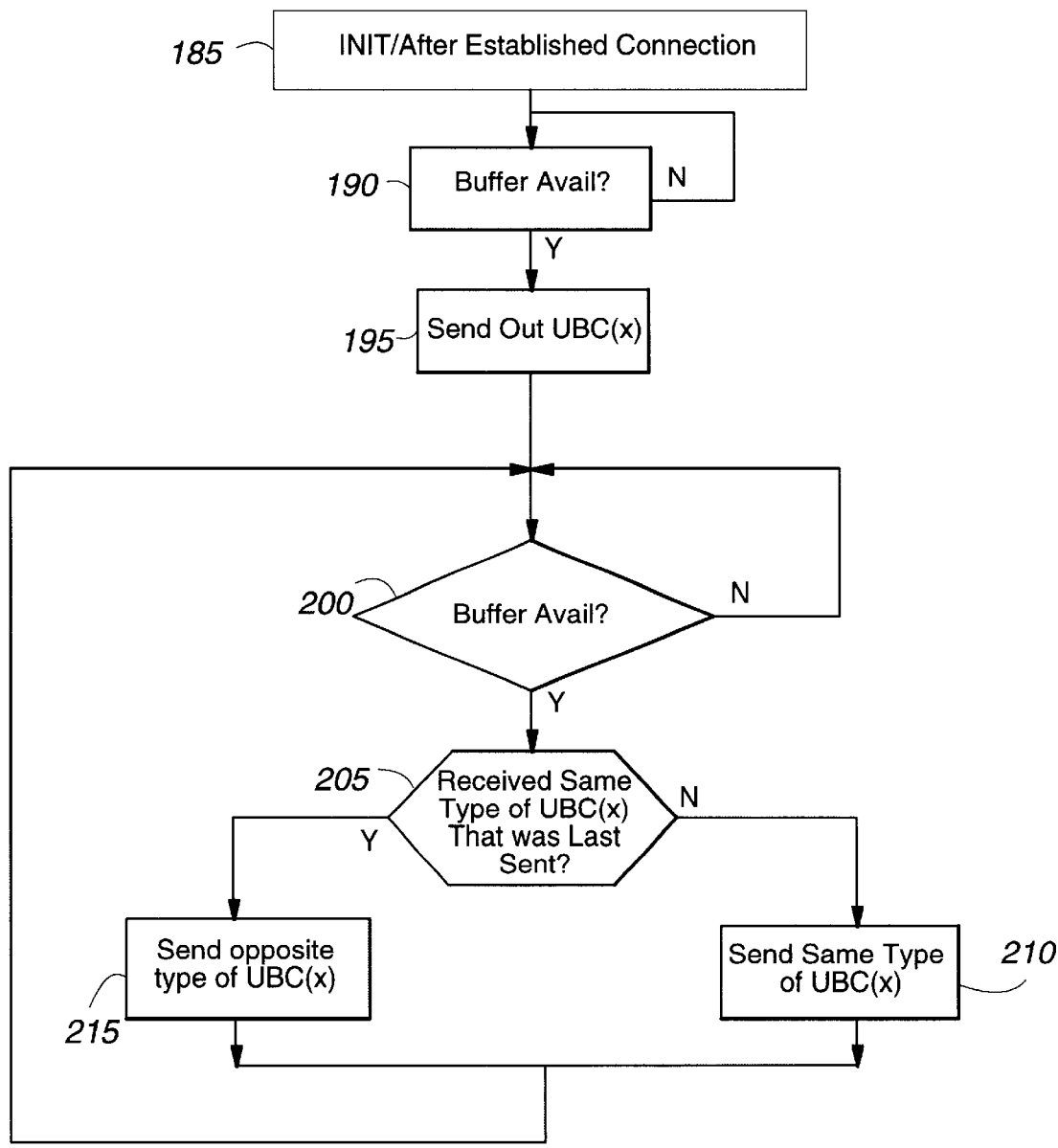
FIG. 5 shows a flow diagram for an originator node performing the steps shown in FIG. 3.
Figure 6A:
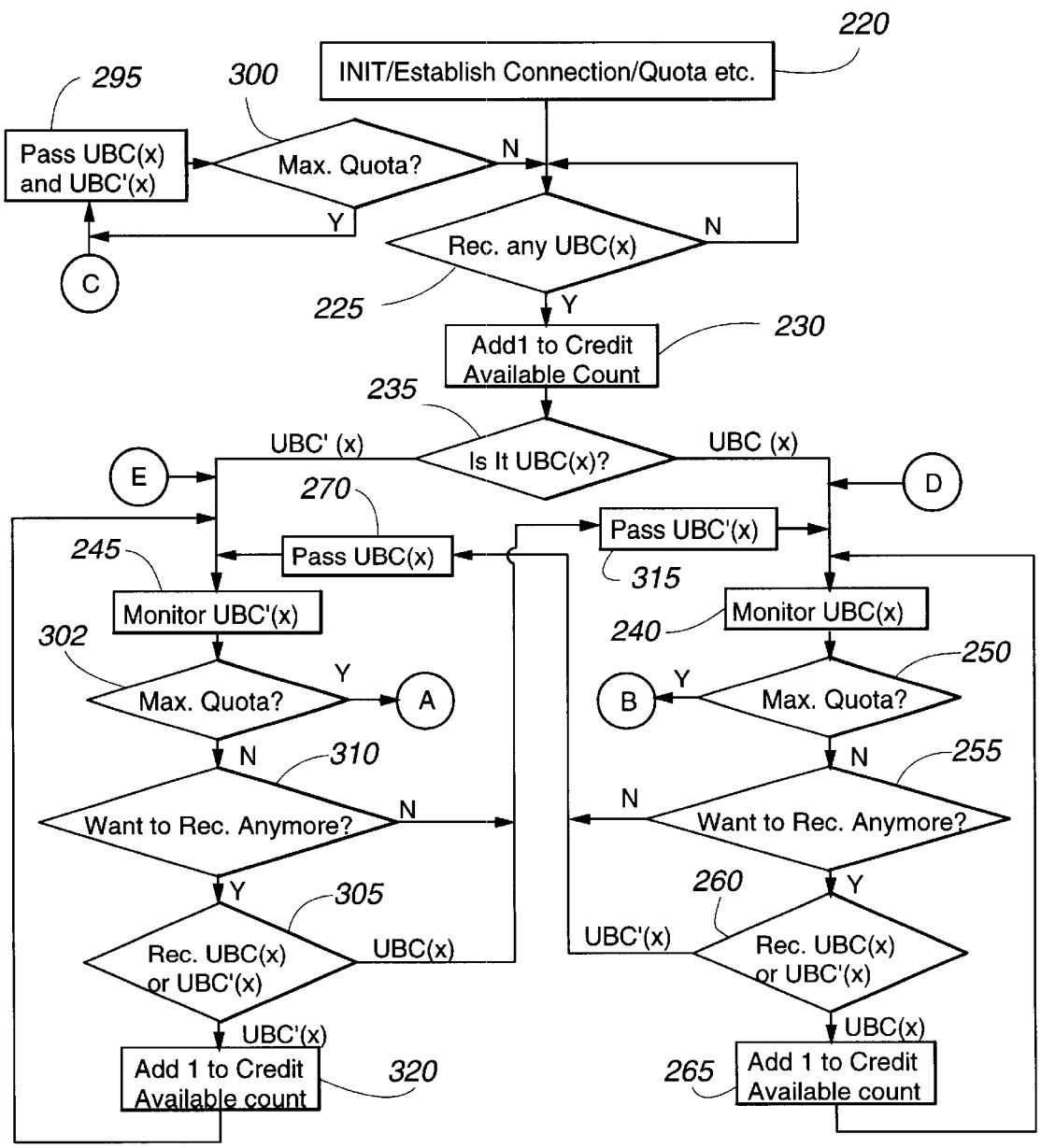
FIGS. 6a–b shows a flow diagram for a target node performing the steps shown in FIG. 4.
Figure 6B:
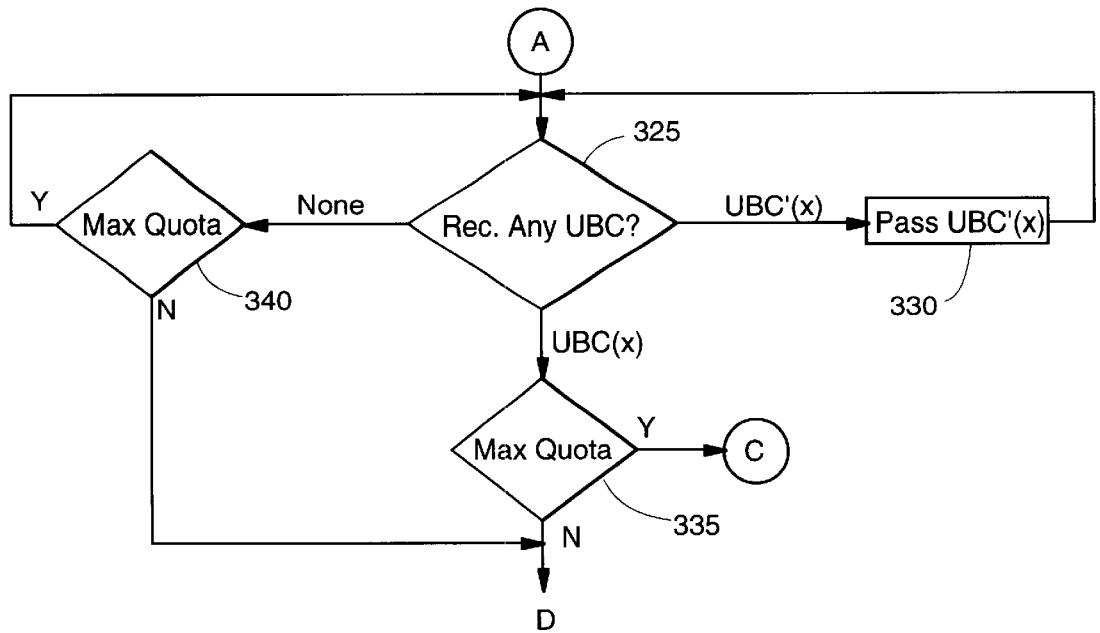
Figure 6B:
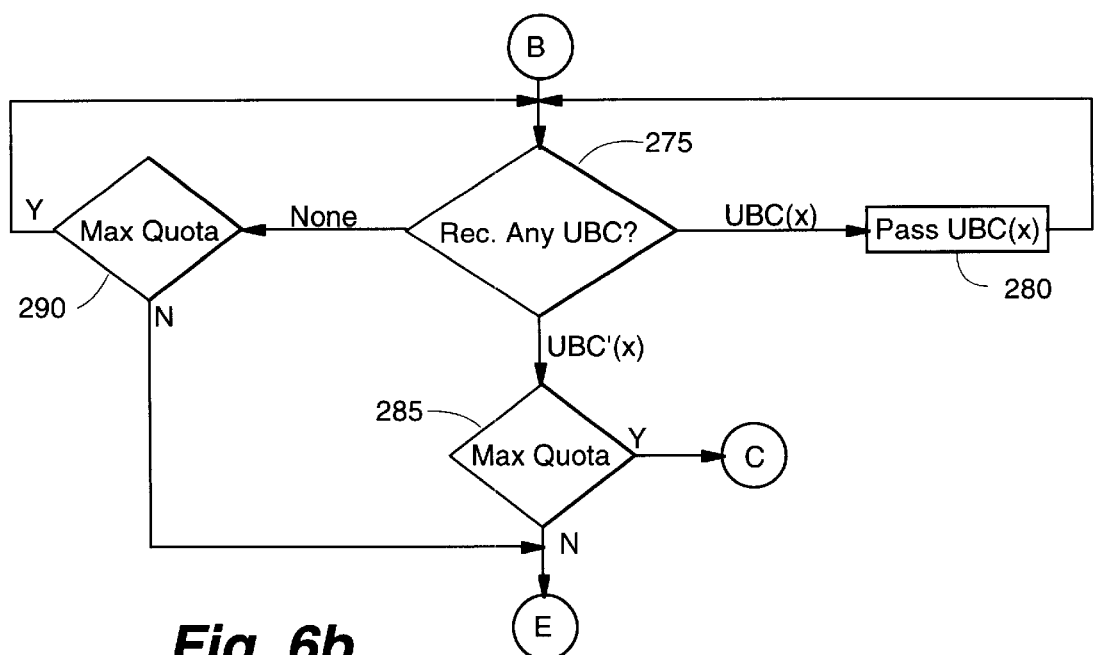

Referring to FIGS. 5 and 6a–b, example flowcharts of an embodiment of the above steps is shown. In the description below, the following terms are used as defined herein:

Unit of Buffer Credit (UBC): A credit signal/token transmitted over the network 75 by a Buffer Credit Originator node 130 to signal that it has a unit of buffer memory available to receive a unit of data packet.

Buffer Credit Originator: An originator node 130 that generates and transmits the buffer credit.

Buffer Credit Receptionist: A target node 135 that may absorb the buffer credit.

Packet/Data Packet: A unit of data accumulated by a target node 135 for transmission to an originator node 130.

UBC(x): A Buffer Credit token of the first type generated by an originator node 130 with a node ID of x, when the originator node 130 is in the first state.

UBC'(x): A Buffer Credit token of the second type generated by an originator node 130 with node ID of x, when the originator node 130 is in the second state.

UBCQ(y,x): Unit of Buffer Credit Quota or quota of UBCs that a target node 135 with a node ID of y can absorb from an originator node 130 with a node ID of x. The value of UBCQ(y,x) can be selected depending on implementation requirements. There can be three different quota settings. When UBCQ(y,x)=0, depending on implementation or the type of node using the quota, either: (a) the target node y may absorb a maximum of one credit token at a time from the originator node x when the target node y has a data packet ready to transmit to the originator node x, or (b) the target node y may absorb as many credits as it desires. When UBCQ(y,x)=1, Asymmetric Mode, each target node y is allowed to receive one credit token from the originator node x at a time, allowing credit tokens to be evenly distributed to all target nodes that are allowed to receive a credit token from the originator node. When UBCQ(y,x)>1, Symmetric Mode, the target nodes y closer down stream to the originator node x can receive up to their quota of credit tokens before other target nodes further down stream can do so. This is a fair bias credit token distribution, whereby in some implementations, target nodes with higher priority can promptly transmit data to an originator node.

Referring to FIG. 5, in another embodiment of the invention, after establishing connections with one or more target nodes 135 (step 185), the originator node 130 with node ID of x determines if a buffer memory is available therein (step 190). If not, the originator node 130 continues checking for available buffer memory. If buffer memory is available, the originator node 130 generates a UBC of the first type, UBC(x), and transmits it over the network 75 (step 195). Thereafter, the originator node 130 enters a credit generation and monitoring mode in which the originator node 130 determines if a unit of buffer memory is available therein (step 200). If not, it continues checking for available buffer memory. Once buffer memory becomes available, the originator node 130 first determines the type of UBC to generate by checking the type of UBC returned from the network 75 (step 205). If the originator node 130 did not receive any UBCs back from the network, or if it did not receive the same type of UBC as it last generated, the originator node 130 generates the same of type of UBC as it last generated: UBC(x) for this example (step 210). However, if the type of UBC the originator node 130 receives back from the network 75 is the same type of UBC as it last generated, the originator node generates the second of type of UBC: UBC'(x) for this example (step 215). In either case, the originator node 130 then proceeds back to step 200.

Referring to FIGS. 6a–b, after initialization, establishing a connection with a originator node and determining its credit quota UBCQ(y,x) (step 220), the target node 135 with node ID of y monitors the network 75 for UBCs (step 225). When it first receives a UBC, the target node 135 absorbs the UBC and increments the count of UBCs it has absorbed by one (step 230). The target node 135 then determines the type of UBC just received (step 235). If UBC(x), it enters a UBC(x) monitoring loop beginning with step 240, otherwise, it enters a UBC'(x) monitoring loop beginning with step 245. In the UBC(x) monitoring loop, the target node 135 monitors the network 75 for the next UBC. Upon receiving a UBC, and if the target node 135 has not reached its quota (step 250), the target node 135 determines if it needs any UBCs (step 255). If so, and if the UBC received is a UBC(x) (step 260), the UBC is absorbed and the UBC count is incremented (step 265). The target node 135 then proceeds back to step 240 to monitor the network 75 for other UBCs.

If in step 255 the target node did not need any more UBCs, or if in step 260 the type of UBC received was UBC'(x), the target node 135 passes the UBC along over the network 75 without absorbing it (step 270) and proceeds to the UBC'(x) monitoring loop (step 245). However, if in step 250, the target node 135 has absorbed UBC(x)s up to its quota, it proceeds to step 275 to monitor incoming UBCs where it passes incoming UBC(x)s over the network 75 (step 280), and if it receives a UBC'(x) and the UBC count falls below its quota (step 285), or no UBC(x) is received and the UBC count falls below its quota (step 290), the target node 135 proceeds to the UBC'(x) monitoring loop in step 245. If a UBC'(x) is received while the count is up to the quota, the target node 135 proceeds to step 295 where it continues to pass along all UBCs, and if its UBC count drops below the quota (step 300) the target node 135 proceeds back to step 225.

In the UBC'(x) monitoring loop beginning with step 245, upon receiving a UBC and if it has not reached its quota (step 302), if the UBC is a UBC(x) (step 305) or if the target node 135 does not need any more UBCs (step 310), the target node 135 passes along the received UBC (step 315) and proceeds to the UBC(x) monitoring loop in step 240. However, if in step 302, the target node 135 has absorbed UBC'(x)s up to its quota, it proceeds to step 325 where it monitors incoming UBCs, passing along incoming UBC'(x)s over the network 75 (step 330). If in step 325, the target node 135 receives a UBC(x) but has not reached it maximum quota (step 335), the target node 135 proceeds to the UBC monitoring loop in step 240. If in step 335, the target node 135 has reached its maximum quota, it proceeds to step 295 above. And, if in step 325 the target node 135 does not receive any UBCs and it has not reached its maximum quota (step 340), it proceeds to the UBC(x) monitoring loop in step 240. If in step 302, the target node has not reached its maximum quota and the UBC received is a UBC'(x), the UBC is absorbed and the UBC count is incremented by one (step 320).

Figure 7:
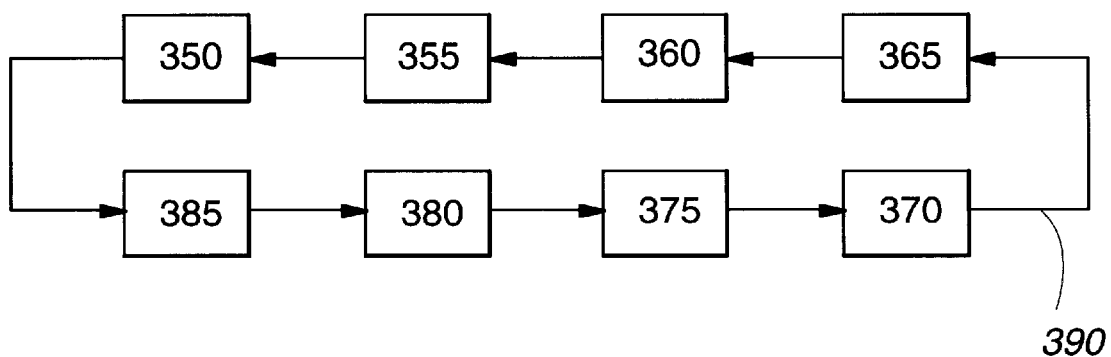
FIG. 7 shows a block diagram of another example communication system architecture in which the present invention can be implemented.

Referring to FIG. 7, an example communication system 345 implementing the above steps comprises eight nodes 350, 355, 360, 365, 370, 375, 380 and 385 interconnected via a ring network 390. In one example operation scenario, nodes 350, 360, 365 and 370 are target nodes with which originator node 380 has established connections. Each of the target nodes 350, 360, 365 and 370 may transmit a unit of data (packet) to the node 380 upon absorbing at least one UBC from the node 380. In this example, the target nodes 350, 360, 365 and 370 have respective quotas of UBCQ(350, 380)=5; UBCQ(360, 380)=5; UBCQ(365, 380)=5; and UBCQ(370, 380)=5. Initially, the node 380 transmits twelve UBC(380)s. The node 370 absorbs up to its quota of five UBC(380)s and passes along the remaining seven UBC(380)s over the network 390. The node 365 absorbs up to its quota of five UBC(380)s and passes along the remaining two UBC(380)s over the network 390. The node 360 absorbs the remaining two UBC(380)s, and no UBC(380)s remain to return to the node 380. Thereafter, nodes 370 and 365 change states such that they can absorb UBC'(380)s only, but node 360 can continue absorbing UBC(380)s.

The node 380 then transmits fifteen more UBC(380)s. Since the nodes 370 and 365 can only absorb UBC'(380)s, they pass along the UBC(380)s over the network 390. The node 360 absorbs three of the 15 UBC(380)s passed along by the nodes 370 and 365, and having reached its quota of five UBCs, the node 360 passes along the remaining twelve UBC(380)s over the network 390. The node 360 also changes states such that it can absorb UBC'(380)s only. The node 350 absorbs up to its quota of five UBC(380)s and passes along the remaining seven UBC(380)s over the network 390. The node 350 also changes state to absorb only UBC'(380)s. The remaining seven UBC(380)s return to the node 380, wherein the node 380 having received the same type of UBC as it last sent out (i.e. UBC(380)), changes states and thereafter generates and transmits UBC'(380)s until it receives back a UBC'(380) from the network 390 to again change states to generate UBC(380)s.

In a variation of the above example, after the node 360 absorbs up to its quota of UBC(380)s, the node 360 transmits two data packets to the node 380. As before, the node 360 changes states where it can only absorb UBC'(380)s. Although the UBC count of the node 360 falls below its quota of five, since the node 360 can only absorb UBC'(380)s, it passes along all UBC(380)s it receives until the node 380 changes states and transmits UBC'(380)s. This allows the node 350 to receive UBC(380)s transmitted by the node 380, providing it with a fair opportunity to transmit data to the node 380. As the node 380 transmits UBC'(380)s, though the nodes 370 and 365 are monitoring the network 390 for UBC'(380)s, they cannot absorb incoming UBC'(380)s because they have reached their quota of 5 UBCs from the node 380, and have not yet sent out any data packets to the node 380 to drop their UBC count below their respective quotas. Therefore, the nodes 370 and 365 pass along incoming UBC'(380)s downstream over the network 390 to the node 360. The node 360 absorbs two of the incoming UBC'(380)s to reach its quota of 5, and passes along the remaining UBC'(380)s over the network 390 to the node 350 downstream. Since the node 350 is already up to its quota, it passes along all the remaining UBC'(380)s over the network 390 to return to the node 380. Upon receiving the UBC'(380)s the node 380 changes states and transmits UBC(380)s.

In another example operation scenario based on the above steps, the node 380 is an originator with a connection established with the node 365 as a target node. The quota UBCQ(365, 380)=3 whereby the target node 365 can only absorb three UBCs from the originator node 380. Initially, the node 380 generates and transmits two UBC(380)s over the network 390. The node 365 absorbs all two UBC(380)s from the network 390, increasing its UBC count to 2. The node 380 then generates and transmits two more UBC(380)s over the network 390. The node 365 absorbs only one of the two UBC(380)s reaching its credit quota of 3, passing along the fourth UBC(380) over the network 390. The node 365 then changes states so that it only absorbs UBC'(380)s. If no other target node absorbs the fourth UBC(380), it will return to the node 380. When the node 380 receives the fourth UBC(380) it changes states, thereafter generating and transmitting UBC'(380)s over the network 390 until it receives a UBC'(380) back from the network 390.

Thereafter, because the node 365 has absorbed UBCs up to its quota, it must pass along all UBC'(380)s. Upon doing so, the node 365 changes states to absorb any UBC from the node 380 if its UBC count falls below its quota. If, however, the node 365 transmits two packets to the node 380, and the node 380 transmits three UBC(380)s, since the node 365 can absorb any type of UBC from the node 380 and the node 365 has only one more packet to send to the node 380, the node 365 absorbs two of the three UBC(380)s and passes along the third UBC(380) over the network 390.

Figure 8:
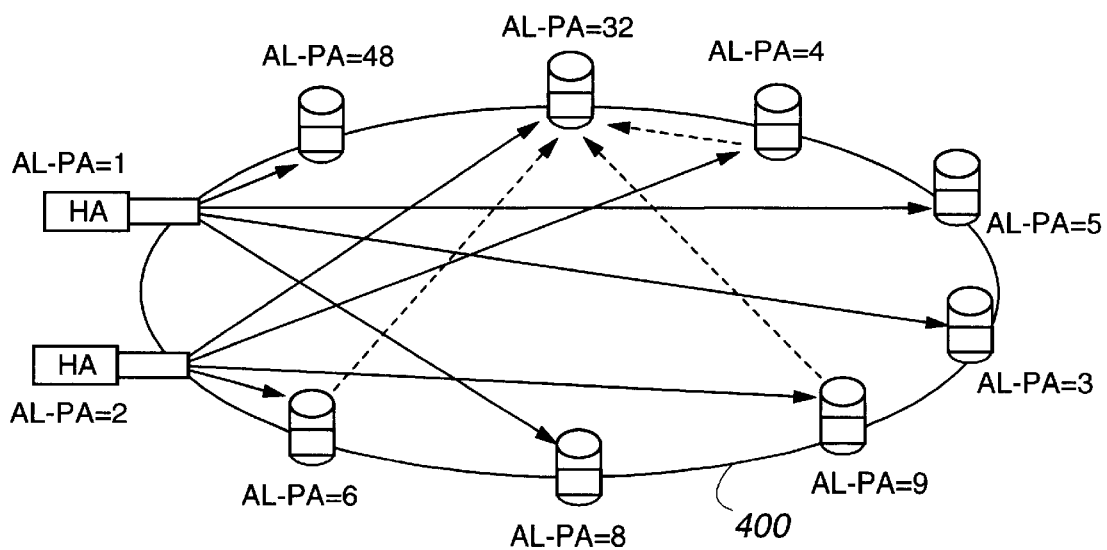
FIG. 8 shows a block diagram of another example communication system architecture in which the present invention can be implemented.
Figure 9:
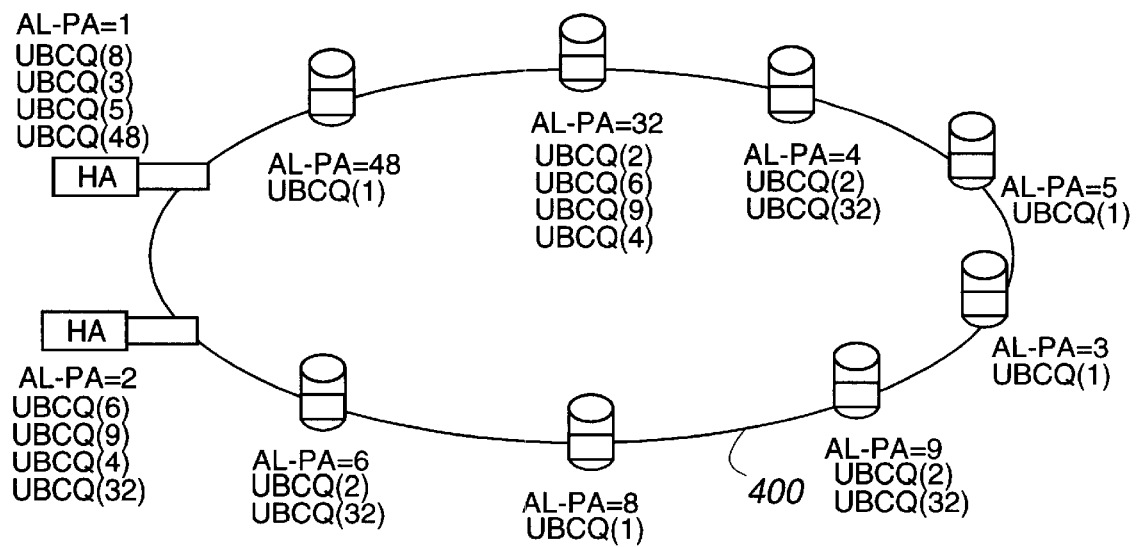
FIG. 9 shows the example architecture of FIG. 8 with originator node and target node quotas depicted thereon.

Referring to FIG. 8, another example ring communication system 395 implementing an embodiment of the method of the present invention comprises eight target nodes, such as disk drives, having node IDs (AL-PA): 6, 8, 9, 3, 5, 4, 32 and 48. The communication system 395 further comprises two originator nodes, such as host adaptors (HA), having nodes IDs (AL-PA): 1 and 2. Said nodes are all interconnected over a ring network 400. A subset of the nodes have established connections with one another over the network 400 as follows: node 1 has established a connection to nodes 8, 3, 5 and 48; node 2 has established a connection to nodes 6, 9, 4 and 32; node 6 has established a connection to node 32; node 9 has established a connection with node 32; and node 4 has established a connection to node 32. The connections are shown by arrows in FIG. 8. Referring to FIG. 9, each of the nodes also has a UBCQ or quota value for the maximum number of credit tokens it can absorb from nodes it is connected to.

Figure 10:
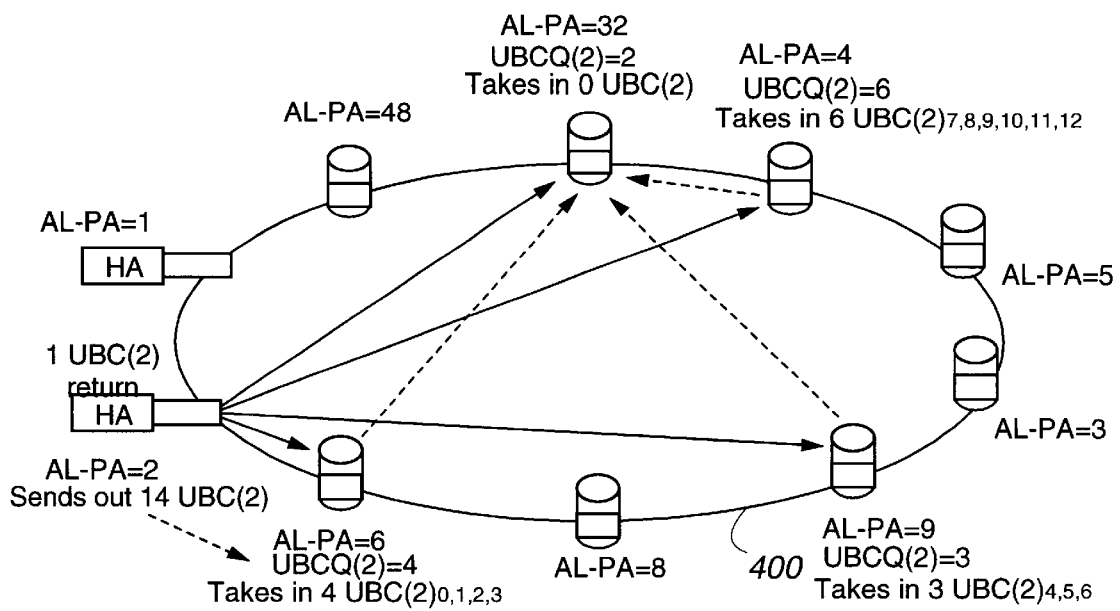
FIG. 10 shows credit token distribution among the target nodes of the example architecture of FIG. 8 after an example operation scenario.

Referring to FIG. 10, in an example operation scenario, the originator node 2 begins with its originator state in the first state wherein it generates UBCs. The target nodes 6, 9, 4 and 32 begin with their respective target states in the first state wherein said target nodes can only absorb UBCs. The originator node 2 generates and transmits fourteen UBC(2)s over the network 400. Only the nodes with which the node 2 has established a connection can absorb the transmitted UBC(2)s. As such the target node 6, having a UBCQ(2)=4, absorbs four of the UBC(2)s, namely $UBC(2)_0$, $UBC(2)_1$, $UBC(2)_2$ and $UBC(2)_3$, and passes along the remaining ten UBC(2)s down stream over the network 400. The node 6 also toggles its target state from the first state to the second state whereupon it can only absorb UBC'(2)s. The target node 9, having a UBCQ(2)=3, absorbs three of the UBC(2)s, namely $UBC(2)_4$, $UBC(2)_5$ and $UBC(2)_6$, and passes along the remaining seven down stream over the network 400. The node 9 also toggles its target state from the first state to the second state whereupon it can only absorb UBC'(2)s. The target node 4, having a UBCQ(2)=6, absorbs six of the UBC(2)s, namely $UBC(2)_7$, $UBC(2)_8$, $UBC(2)_9$, $UBC(2)_{10}$, $UBC(2)_{11}$ and $UBC(2)_{12}$, and passes along the remaining one down stream over the network 400. The node 4 also toggles its target state from the first state to the second state whereupon it can only absorb UBC'(2)s. The node 32, having a UBCQ(2)=2, receives the remaining one UBC(2), but decides not to absorb it as the node 32 may not have any data to transfer to the target node 2 at this time. As such, the node 32 passes along the remaining one UBC(2) which returns to the originator node 2. Having received a UBC of the same type as it sent out, the originator node 2 toggles its originator state from the first state to the second state, thereafter generating and transmitting UBC'(2)s until it receives a UBC'(2) back from the network, whereupon it toggles its originator state from the second state to the first state, and again generates and transmits UBC(2)s.

According to another embodiment of the present invention, each target node 135 with node ID of y toggles its target state from one state to another after absorbing each UBC (Symmetric Mode). As such, after receiving a UBC(x) from an originator node 130 with node ID of x, the target node toggles its target state so that it can only absorb a UBC'(x) next. And, after receiving a UBC'(x), the target node 135 toggles its target state so that it can only absorb a UBC(x) next. Further, if the originator node 130 is aware of the number of connected target nodes 135, the originator node 130 can determine the maximum number of UBCs that can be consumed by all the target nodes 135. As such, the originator node 130 can toggle its originator state to change the type of credit tokens generated after it has generated and transmitted said maximum number of UBCs (Auto Credit Switching Mode).

Figure 11:
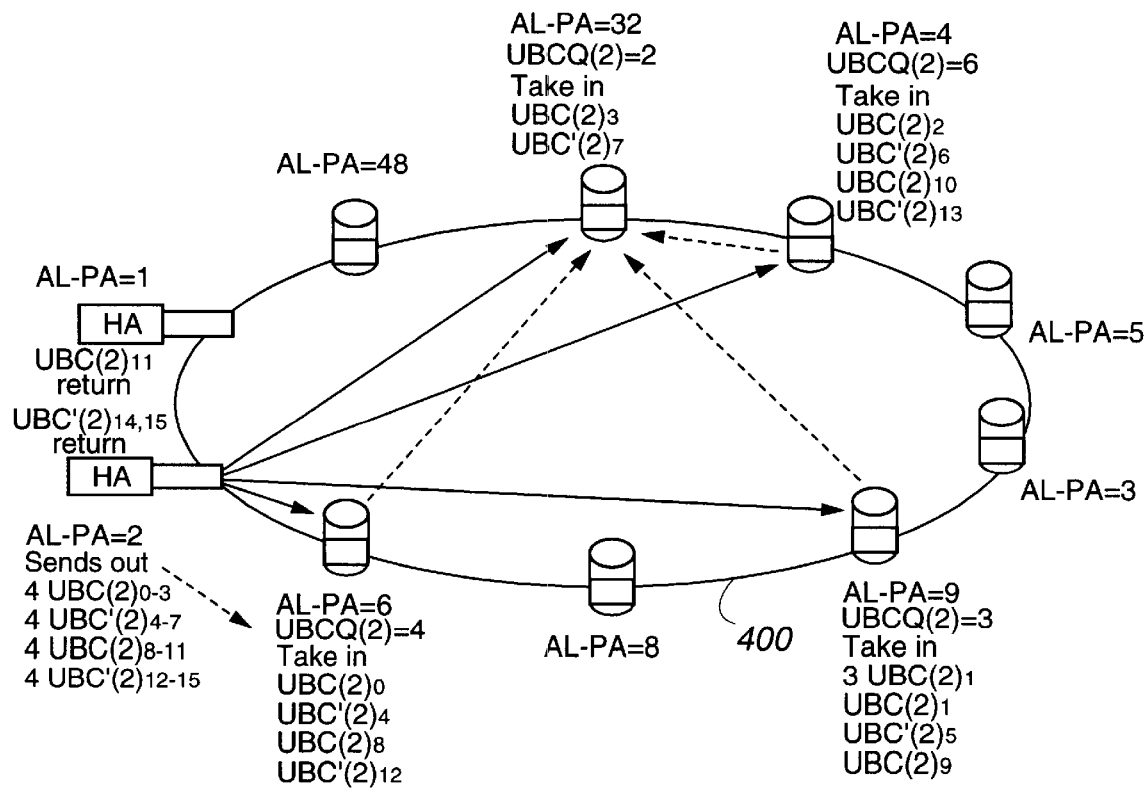
FIG. 11 shows credit token distribution among the target nodes of the example architecture of FIG. 8 after another example operation scenario.

Referring to FIG. 11, in the example communication system 395 above, with the target nodes 6, 9, 4, and 32 in Symmetric Mode and the originator node 2 in the Auto Credit Switching Mode, an example operation scenario is now described. Initially, the node 2 generates and transmits four UBC(2)s, namely $UBC(2)_{0-3}$. The nodes 6, 9, 4 and 32 each absorb one UBC(2), namely $UBC(2)_0$, $UBC(2)_1$, $UBC(2)_2$ and $UBC(2)_3$, respectively. The node 2 then generates and transmits four UBC'(2)s, namely $UBC'(2)_{4-7}$. The nodes 6, 9, 4 and 32 each absorb one UBC'(2), namely $UBC'(2)_4$, $UBC'(2)_5$, $UBC'(2)_6$ and $UBC'(2)_7$, respectively. The node 2 then generates and transmits four UBC(2)s, namely UBC $(2)_{8-11}$. The nodes 6, 9 and 4 each absorb one UBC(2), namely $UBC(2)_8$, $UBC(2)_9$ and $UBC(2)_{10}$, respectively. The node 32 does not absorb any more UBCs as it has absorbed up to its quota, and $UBC(2)_{11}$ returns to the originator node 2. The node 2 then generates and transmits 4 UBC'(2)s, namely $UBC'(2)_{12-15}$. The nodes 6 and 4 each absorb one UBC'(2), namely $UBC'(2)_{12}$, and $UBC(2)_{13}$, respectively. The nodes 9 and 32 having reached their quota, do not absorb any UBCs. Therefore, $UBC'(2)_{14}$ and $UBC'(2)_{15}$ return to the originator node 2. The node 2 can continue to generate and transmits UBCs as described above to provide all the connected nodes with their quota of UBCs. As such, the method of the present invention assures that each target node has a fair opportunity to receive buffer credit tokens from the originator for transmitting data to the originator node.

Figure 12A:
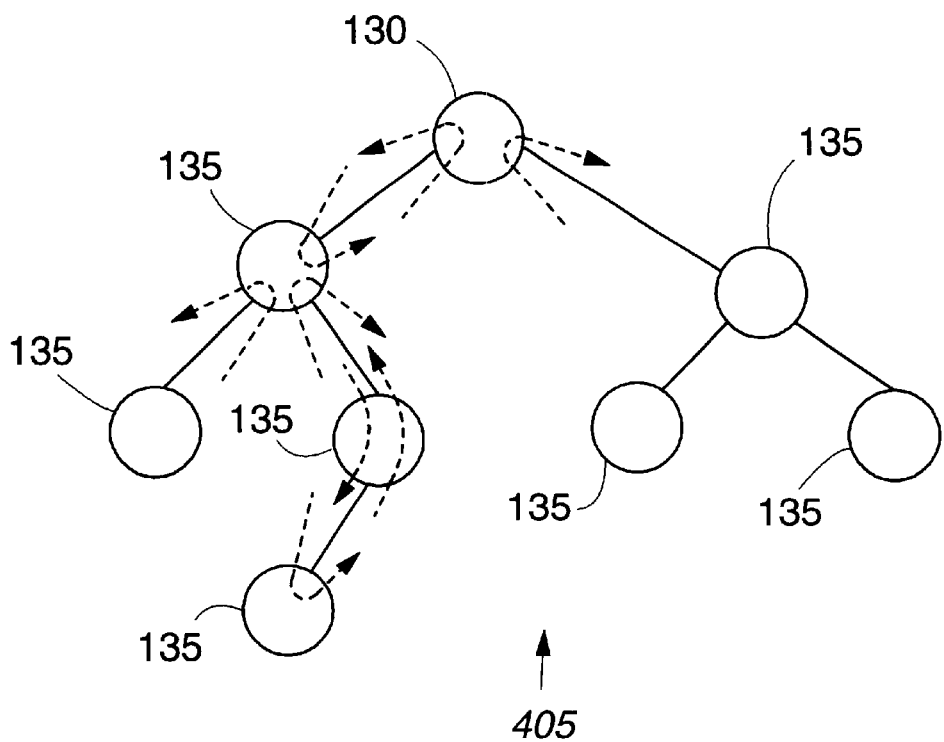
FIG. 12a shows an example communication system tree network architecture in which the present invention can be implemented.
Figure 12B:
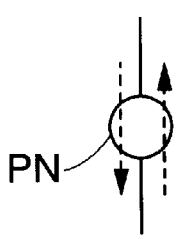
FIGS. 12b–d show examples of data traffic routing through pass-through, head/end, and mixed nodes in the tree network of FIG. 12a, respectively.
Figure 12C:
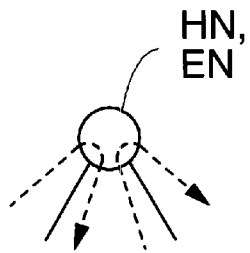
Figure 12D:
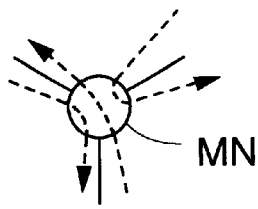

The method of present invention can be implemented in communication systems with various network interconnect topologies and types such as ring 75 shown in FIG. 2 and tree 405 shown in FIG. 12a. Referring to FIGS. 12b–d, each node can comprises a pass-through node (PN), a head node (HN) or an end node (EN), or a mixed node (MN). A pass-through node resides between head nodes and end nodes in the tree and passes data through as shown in dotted lines in FIG. 12b. Head nodes and end nodes behave in a similar manner as shown in dotted lines in FIG. 12c. Typically, the node at the top of the tree is designated has a head node and a child node at the bottom of the tree is designated as an end node. A mixed node behaves as a pass-through node and a head/end node as shown in dotted lines in FIG. 12d. In a tree network, an end node must be able to return a credit token back to the top of the tree. Nodes with more than two branches can act as mixed nodes while nodes with only two branches act as pass through nodes.

The network can comprise a Fiber Channel Loop with or without arbitration. Each node in the network can assume an originator node role or a target node role depending on the implementation and the type of node. Further, each target node can have a connection with more than one originator node for transferring data. In that case, the target node can maintain separate credit token counts, quotas, target states and toggle conditions with respect to each originator node, and interact with each originator node accordingly.

For example, a target node can have: (1) a toggle condition where it changes its target state associated with one originator node when the target node absorbs one credit token from that originator node (Symmetric Mode) and (2) another toggle condition where it changes its target state associated with another originator node when the target node receives up to its quota of credit tokens from that other originator node (Asymmetric Mode). Similarly, each originator node can have connections with more than one set of target nodes. In that case, the originator node can maintain separate originator states and toggle conditions for each set of target nodes, and interact with each set of target nodes accordingly. For example, an originator node can utilize an Auto Credit Switching Mode credit token distribution for one set of target nodes, and utilize another credit distribution mode for another set of target nodes.

Each data packet as used herein comprises a quantity of data, and the originator node can select the amount of data in a data packet it receives by specifying its quantity in the credit tokens it sends out. The target nodes transmit only the quantity of data in a packet as specified in a corresponding credit token absorbed. Alternatively, the data packets can be fixed in size. In a communication system with only one size packet or multiple of packets similar size, each credit token is used corresponding to one packet. In a communication system with multiple packets sizes, for example: Type_A= 128 bytes max, Type_B=256 bytes max, and Type_C=1024 bytes max, the system can use the credit token corresponding to a "unit of buffer size" with an example packet size of 128 bytes. For Type_A packets a single credit token is required, for Type_B packets two credit tokens are required, and for Type_C packet, eight credit tokens are required. By implementing the credit token as "unit of buffer size", each device can save on memory and buffer space because it does not need to allocate 1024 bytes of buffer for a 128 bytes packet.

The present invention also contemplates a credit token with more than two types. In that case, each target node has as many states as the number of types of credit tokens and each originator node has as many states as the number of types of credit tokens. Further, the toggle condition for each node transitions the node through the different states of each node.

In another aspect, the method of the present invention described above is implemented as program instructions to be performed by processors 80, 110 or to configure logic circuits 87, 122 in the nodes 130 and 135 of the multi-node communication network 60 above. The program instructions can be implemented in a high level programming language such as C, Pascal, etc. which is then compiled into object code and linked with object libraries as necessary to generate executable code for the processors 80, 110. The program instructions can also be implemented in assembly language which is then assembled into object code and linked with object libraries as necessary to generate executable code.

Logic circuits 87, 122 can be configured by the program instructions to perform the steps described above. The logic circuits 87, 122 can be an Application Specific Integrated Circuit (ASIC). An ASIC is a device designed to perform a specific function as opposed to a device such as a microprocessor which can be programmed to performed a variety of functions. The circuitry for making the chip programmable is eliminated and only those logic functions needed for a particular application are incorporated. As a result, the ASIC has a lower unit cost and higher performance since the logic is implemented directly in a chip rather than using an instruction set requiring multiple clock cycles to execute. An ASIC is typically fabricated using CMOS technology with custom, standard cell, physical placement of logic (PPL), gate array, or field programmable gate array (FPGA) design methods. A dedicated logic circuit, such as an ASIC, provides higher performance than a microprocessor since the logic is implemented directly in the chip rather than using an instruction set requiring multiple clock cycles to be executed by a microprocessor.

Other means, comprising memory devices, processors, logic circuits, and/or analog circuits, for performing the above steps are possible and contemplated by the present invention. For example, for devices such as disk drives, tape drives and network connections with relatively high volume of traffic, the above steps of protocol for buffer flow control are preferably implemented with the ASIC. However, for devices such as storage cabinet monitoring node, diagnostic port and low speed network connection, the above steps can be implemented in firmware, with the exception of the frame reception/transmission which may be at very high speed.

As further examples, each node includes means for controlling data transmission and/or reception in each node over the network 75 which are application dependent. For example, storage devices such as hard disk drives can establish connection with multiple host systems to provide the host systems with random access (Read/Write) to storage media. Therefore, disk devices can have multiple data traffic connections actively transmitting or receiving data in or out of the disk interface ASIC. Therefore, disk devices need to provide more credit tokens because of multiple connections. However, disk devices do not require the requested data to arrive at the exact time when the data is needed. By contrast, storage devices such as streaming tape devices, which only make a single connection with a host system at any time, do not provide random access. Because of the tape streaming behavior, a streaming tape device: (1) requires the data to arrive at the exact time when it needs to write the data to the media and (2) requires to transfer data in its buffer to the host system as soon as possible in order to over run the buffer. As such, the streaming tape device must access the bus almost at the exact time when it needs to. Also, a streaming tape device does not need to provide as many credit tokens as a disk device as long as the streaming tape device can provide enough credits to keep data coming at the tape access speed for a single host connect.

Other examples of applications of the present invention unrelated to communication/network systems include: (1) transportation, traffic, highway flow control management, (2) resource and cash flow control management, (3) supply and demand, capacity control modeling; etc.

Although the present invention has been described in considerable detail with regard to the preferred versions thereof, other versions are possible. Therefore, the appended claims should not be limited to the descriptions of the preferred versions contained herein.

What is claimed is:

1. In a communication system comprising a plurality of data processing nodes including at least one originator node and a plurality of target nodes, each data processing node including means for controlling data transmission and/or reception from other data processing nodes over a communication network, a method for providing the target nodes with fair opportunity to transfer data to the originator node, the method comprising the steps of:

For the originator node:
(a) maintaining at least one originator state, the originator state including a first state and a second state;
(b) when the originator node desires to receive at least one data packet,
   (1) generating a credit token of: (i) a first type if the originator state is in the first state, or (ii) a second type if the originator state is in the second state; and
   (2) transmitting the credit token over the communication network to signal one or more target nodes to transfer data to the originator node; and
(c) toggling the originator state from one state to another if an originator toggle condition is satisfied; and For each target node:
(d) maintaining: (1) a count of credit tokens absorbed by the target node over the network from the originator node, and (2) a quota of the number of credit tokens the target node may absorb from the originator node;
(e) maintaining at least one target state, the target state including: (1) a first state indicating that the target node can only absorb credit tokens of the first type from the originator node and (2) a second state indicating that the target node can only absorb credit tokens of the second type from the originator node;
(f) receiving a credit token from the originator node over the network;
(g) absorbing the received credit token if: (1) the credit token is of a type corresponding to the target state, and (2) said count is less than said quota for the target node;
(h) incrementing said count by one if the credit token is absorbed; and
(i) toggling the target state from one state to another if a target toggle condition is satisfied.

2. The method of claim 1, wherein for at least one target node the step of absorbing a credit token in step (g) is further conditioned on the target node having one or more data packets to transmit to the originator node over the network.

3. The method of claim 1, wherein for at least one target node the target toggle condition in step (i) comprises the count being equal to the quota of the target node.

4. The method of claim 1, further comprising the step of each target node retransmitting a received credit token over the network if the target node cannot absorb the credit token in step (g).

5. The method of claim 1, wherein the communication network comprises a ring interconnect topology.

6. The method of claim 1, wherein the communication network comprises a tree interconnect topology.

7. The method of claim 1, wherein two or more of the target nodes have different quotas for the number of credit tokens each node may absorb from the originator node.

8. The method of claim 1, further comprising the step of: for at least one target node, if the credit count is greater than zero, transmitting an available data packet to the originator node over the network and decrementing said count by one.

9. The method of claim 1, wherein the originator toggle condition in step (c) comprises receiving a credit token previously generated by the originator node back from the network.

10. The method of claim 1, wherein the originator toggle condition in step (c) comprises transmitting the Nth credit token.

11. The method of claim 1, wherein the target toggle condition in step (i) comprises a credit token being absorbed in step (g).

12. In a communication system comprising a plurality of data processing nodes including at least one originator node and a plurality of target nodes, each data processing node including means for controlling data transmission and/or reception from other data processing nodes over a communication network, a method for providing the target nodes with fair opportunity to transfer data to the originator node, the method comprising the steps of:

For the originator node:
(a) maintaining at least one originator state, the originator state including a first state and a second state;
(b) when the originator node desires to receive at least one data packet,
   (1) generating a credit token of: (i) a first type if the originator state is in the first state, or (ii) a second type if the originator state is in the second state; and
   (2) transmitting the credit token over the communication network to signal one or more target nodes to transfer data to the originator node; and
(c) toggling the originator state from one state to another upon receiving a credit token previously generated by the originator node back from the network;

For each target node:
(d) maintaining: (1) a count of credit tokens absorbed by the target node over the network from the originator node, and (2) a quota of the number of credit tokens the target node may absorb from the originator node;
(e) maintaining at least one target state, the target state including: (1) a first state indicating that the target node can only absorb credit tokens of the first type from the originator node and (2) a second state indicating that the target node can only absorb credit tokens of the second type from the originator node;
(f) receiving a credit token from the originator node over the network;
(g) absorbing the received credit token if: (1) the credit token is of a type corresponding to the target state, and (2) said count is less than said quota for the target node;
(h) incrementing said count by one if the credit token is absorbed;
(i) toggling the target state from one state to another if said count is equal to the quota; and
(j) re-transmitting a received credit token over the network if the target node cannot absorb the credit token in step (g).

13. The method of claim 12, wherein for at least one target node the step of absorbing a credit token in step (g) is further conditioned on the target node having one or more data packets to transmit to the originator node over the network.

14. The method of claim 12, wherein two or more of the target nodes have different quotas for the number of credit tokens each node may absorb from the originator node.

15. The method of claim 12, further comprising the step of: for at least one target node, if the credit count is greater than zero, transmitting an available data packet to the originator node over the network and decrementing said count by one.

16. In a communication system comprising a plurality of data processing nodes including at least one originator node and a plurality of target nodes, each data processing node including means for controlling data transmission and/or reception from other data processing nodes over a communication network, a method for providing the target nodes with fair opportunity to transfer data to the originator node, the method comprising the steps of:

For the originator node:
(a) maintaining at least one originator state, the originator state including a first state and a second state;
(b) when the originator node desires to receive at least one data packet,
  (1) generating a credit token of: (i) a first type if the originator state is in the first state, or (ii) a second type if the originator state is in the second state; and
  (2) transmitting the credit token over the communication network to signal one or more target nodes to transfer data to the originator node; and
(c) toggling the originator state from one state to another upon receiving a credit token previously generated by the originator node back from the network;

For each target node:
(d) maintaining: (1) a count of credit tokens absorbed by the target node over the network from the originator node, and (2) a quota of the number of credit tokens the target node may absorb from the originator node;
(e) maintaining at least one target state, the target state including: (1) a first state indicating that the target node can only absorb credit tokens of the first type from the originator node and (2) a second state indicating that the target node can only absorb credit tokens of the second type from the originator node;
(f) receiving a credit token from the originator node over the network;
(g) absorbing the received credit token if: (1) the credit token is of a type corresponding to the target state, and (2) said count is less than said quota for the target node;
(h) incrementing said count by one if the credit token is absorbed;
(i) toggling the target state from one state to another if a credit token is absorbed in step (g); and
(j) re-transmitting a received credit token over the network if the target node cannot absorb the credit token in step (g).

17. The method of claim 16, wherein for at least one target node the step of absorbing a credit token in step (g) is further conditioned on the target node having one or more data packets to transmit to the originator node over the network.

18. The method of claim 16, wherein two or more of the target nodes have different quotas for the number of credit tokens each node may absorb from the originator node.

19. The method of claim 16, further comprising the step of: for at least one target node, if the credit count is greater than zero, transmitting an available data packet to the originator node over the network and decrementing said count by one.

20. A multi-node communication system for providing data transfer among a plurality of data processing nodes over a communication network, the system comprising:

(a) at least one originator node comprising a logic circuit configured by program instructions to perform the steps of:
  (1) maintaining at least one originator state, the originator state including a first state and a second state;
  (2) when the originator node desires to receive at least one data packet,
    (i) generating a credit token of: (1) a first type if the originator state is in the first state, or (2) a second type if the originator state is in the second state; and
    (ii) transmitting the credit token over the communication network to signal one or more target nodes to transfer data to the originator node; and
  (3) toggling the originator state from one state to another if an originator toggle condition is satisfied; and
(b) at least one target node comprising a logic circuit configured by program instructions to perform the steps of:
  (1) maintaining: (i) a count of credit tokens absorbed by the target node over the network from the originator node, and (ii) a quota of the number of credit tokens the target node may absorb from the originator node;
  (2) maintaining at least one target state, the target state including: (i) a first state indicating that the target node can only absorb credit tokens of the first type from the originator node and (ii) a second state indicating that the target node can only absorb credit tokens of the second type from the originator node;
  (3) receiving a credit token from the originator node over the network;
  (4) absorbing the received credit token if: (i) the credit token is of a type corresponding to the target state, and (ii) said count is less than said quota for the target node;
  (5) incrementing said count by one if the credit token is absorbed; and
  (6) toggling the target state from one state to another if a target toggle condition is satisfied.

21. The system of claim 20, wherein: (1) the originator node further comprises means for controlling data transmission and/or reception from other nodes over the communication network, (2) the target node further comprises means for controlling data transmission and/or reception from other nodes over the communication network.

22. The system of claim 20, further comprising a plurality of target nodes, wherein at least one target node includes program instructions for absorbing a credit token further conditioned on the target node having one or more data packets to transmit to the originator node.

23. The system of claim 20, wherein the target toggle condition comprises the count being equal to the quota of the target node.

24. The system of claim 20, wherein the target node further includes program instructions for re-transmitting a received credit token over the network if the target node cannot absorb the credit token.

25. The system of claim 20, further comprising a plurality of target nodes, wherein two or more of the target nodes have different quotas for the number of credit tokens each node may absorb from the originator node.

26. The system of claim 20, wherein the target node further comprises program instructions wherein if the credit count is greater than zero, the target node transmits an available data packet to the originator node over the network and decrements said count by one.

27. The system of claim 20, wherein the originator toggle condition comprises receiving a credit token previously generated by the originator node back from the network.

28. The system of claim 20, wherein the originator toggle condition comprises transmitting the Nth credit token.

29. The system of claim 20, wherein the target toggle condition comprises a credit token being absorbed by target node.

30. A multi-node communication system for providing data transfer among a plurality of data processing nodes over a communication network, the system comprising:
   (a) at least one originator node comprising a logic circuit configured by program instructions to perform the steps of:
      (1) maintaining at least one originator state, the originator state including a first state and a second state;
      (2) when the originator node desires to receive at least one data packet,
         (i) generating a credit token of: (1) a first type if the originator state is in the first state, or (2) a second type if the originator state is in the second state; and
         (ii) transmitting the credit token over the communication network to signal one or more target nodes to transfer data to the originator node; and
      (3) toggling the originator state from one state to another upon receiving a credit token previously generated by the originator node back from the network; and
   (b) at least one target node comprising a logic circuit configured by program instructions to perform the steps of:
      (1) maintaining: (i) a count of credit tokens absorbed by the target node over the network from the originator node, and (ii) a quota of the number of credit tokens the target node may absorb from the originator node;
      (2) maintaining at least one target state, the target state including: (i) a first state indicating that the target node can only absorb credit tokens of the first type from the originator node and (ii) a second state indicating that the target node can only absorb credit tokens of the second type from the originator node;
      (3) receiving a credit token from the originator node over the network;
      (4) absorbing the received credit token if: (i) the credit token is of a type corresponding to the target state, and (ii) said count is less than said quota for the target node;
      (5) incrementing said count by one if the credit token is absorbed;
      (6) toggling the target state from one state to another if said count is equal to the quota; and
      (7) re-transmitting a received credit token over the network if the target node cannot absorb the credit token.

31. The system of claim 30, wherein at least one target node comprises program instructions for absorbing a credit token further conditioned on the target node having one or more data packets to transmit to the originator node.

32. The system of claim 30, further comprising a plurality of target nodes, wherein two or more of the target nodes have different quotas for the number of credit tokens each target node may absorb from the originator node.

33. A multi-node communication system for providing data transfer among a plurality of data processing nodes over a communication network, the system comprising:
   (a) at least one originator node comprising a logic circuit configured by program instructions to perform the steps of:
      (1) maintaining at least one originator state, the originator state including a first state and a second state;
      (2) when the originator node desires to receive at least one data packet,
         (i) generating a credit token of: (1) a first type if the originator state is in the first state, or (2) a second type if the originator state is in the second state; and
         (ii) transmitting the credit token over the communication network to signal one or more target nodes to transfer data to the originator node; and
      (3) toggling the originator state from one state to another upon receiving a credit token previously generated by the originator node back from the network; and
   (b) at least one target node comprising a logic circuit configured by program instructions to perform the steps of:
      (1) maintaining: (i) a count of credit tokens absorbed by the target node over the network from the originator node, and (ii) a quota of the number of credit tokens the target node may absorb from the originator node;
      (2) maintaining at least one target state, the target state including: (i) a first state indicating that the target node can only absorb credit tokens of the first type from the originator node and (ii) a second state indicating that the target node can only absorb credit tokens of the second type from the originator node;
      (3) receiving a credit token from the originator node over the network;
      (4) absorbing the received credit token if: (i) the credit token is of a type corresponding to the target state, and (ii) said count is less than said quota for the target node;
      (5) incrementing said count by one if the credit token is absorbed;
      (6) toggling the target state from one state to another if the received credit token is absorbed by the target node; and
      (7) re-transmitting a received credit token over the network if the target node cannot absorb the received credit token.

34. The system of claim 33, wherein at least one target node comprises program instructions for absorbing a credit token further conditioned on the target node having one or more data packets to transmit to the originator node over the network.

35. The system of claim 33, further comprising a plurality of target nodes, wherein two or more of the target nodes have different quotas for the number of credit tokens each target node may absorb from the originator node.

36. The system of claim 33, wherein the target node further comprises program instructions for transmitting an available data packet to the originator node over the network if the credit count is greater than zero, and decrementing said count by one.

* * * * *